Jan. 17, 1939.     C. J. RANDALL     2,144,082
PACKING STRIP
Filed May 19, 1936
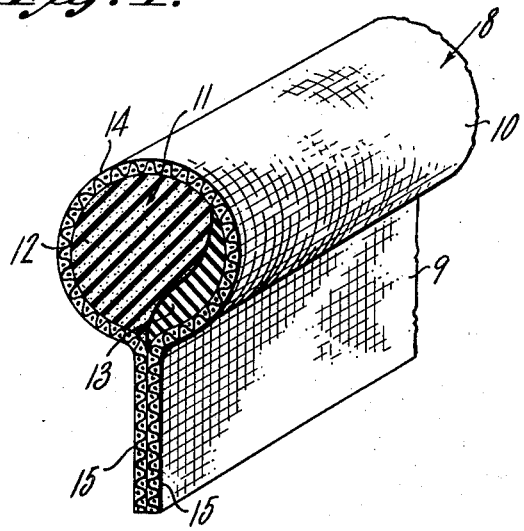
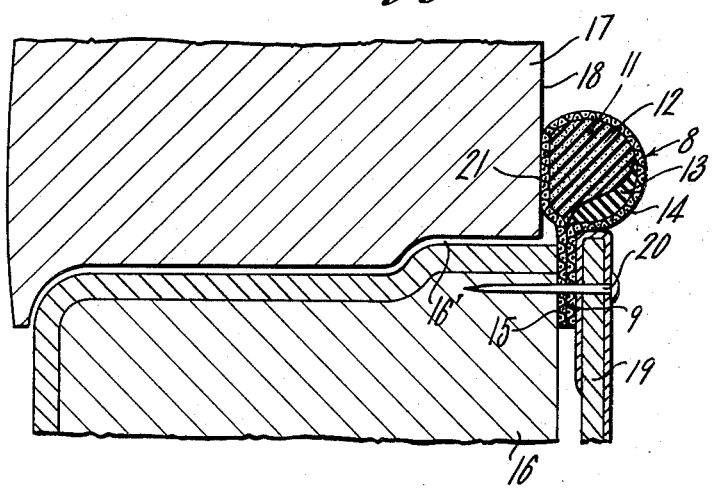
INVENTOR.
CHESTER J. RANDALL
BY
ATTORNEY.

Patented Jan. 17, 1939

2,144,082

UNITED STATES PATENT OFFICE 2,144,082

PACKING STRIP

Chester J. Randall, Naugatuck, Conn., assignor, by mesne assignments, to United States Rubber Company, New York, N. Y., a corporation of New Jersey Application May 19, 1936, Serial No. 80,646

2 Claims. (Cl. 20—69)

This invention relates to an improved packing strip and its use in combination with a closure member to form a seal against the passage of air between such member and its cooperating frame.

The packing strip embodying this invention is particularly useful for sealing the seam between the door of an automobile and its cooperating frame or door jamb. Where used in such construction the strip is provided with a bead and a flange. Packing strips of this general construction have been used heretofore for the same purpose. Such prior packing strips have been made with a bead having a core consisting of either relatively soft or more firm materials. According to the usual practice, the flange is secured to the door jamb and the bead extends into the door opening and when the door is closed it contacts with the bead for the purpose of forming a seal against the passage of air through the seam between the door and its jamb. The strips having cores composed of soft material do not form a good seal because the material along the opposing line supported by the door jamb yields readily and permits the bead to roll backward away from the door without sufficiently compressing the core material along the face of the door to cause it to conform to its irregularities and thereby form a good seal. Where more firm material is used in the core the bead may not roll backward to the same extent as the bead containing the softer material, but the more firm material may not yield sufficiently to form a good seal along its line of contact with the door and in any event where the core is composed entirely of either soft or more firm material the bead is deformed as much along the line where it is supported by the door jamb as it is by the door face and all of the deformation does not take place along the line of contact of the bead with the door as is desirable in order to obtain the best seal.

For the purpose of forming an improved seal it is among the objects of this invention to provide a packing strip having a bead containing a core consisting in part of soft resilient material which is adapted to yield when pressed by either the closure or the frame for same, and consisting in part of a more firm material which is adapted to resist the pressure of the closure or the frame to a greater extent than the softer material and thereby support the softer material and cause the bead to be deformed almost entirely along the line where the seal is to be formed.

The foregoing objects will be more clearly understood by referring to the following description and accompanying drawing in which:

Figure 1 is an isometric view of a section of an improved packing strip embodying this invention; and Figure 2 is a cross section of a closure and the frame therefor having the packing strip applied thereto.

As illustrated in Fig. 1, the packing strip 8 comprises a flange 9 and a bead portion 10 having a composite core 11. The core is formed in part of a segment 12 of soft resilient material, preferably of soft sponge rubber, and is formed in part of a segment 13 of more firm material which is preferably pliable in all directions. For example, the segment 13 may be made of soft dense or solid vulcanized rubber or of a material sold under the trade name of "Plioform", a rubber isomer which may be made by treating rubber with an isomerizing agent such as stannic chloride. The segments 12 and 13 are adhered together and to a cover 14. Where the segments 12 and 13 are made of rubber the foregoing parts are vulcanized together as a unit. The core 11 is preferably made in the form of a cylinder. The cover 14 is preferably made of a strip of fabric which encloses the core and its longitudinal edges 15 extend laterally from the core to provide the flange 9.

In the event the segment 13 is made of dense rubber it is preformed into a strip which is semi-cured and coated with rubber cement and is placed in the fabric cover 14 with a strip of uncured sponge rubber, the latter material forming the segment 12. In the event the segment 13 is made of "Plioform" the fabric cover 14 is run through a calender and the "Plioform" is calendered directly on to the cover in the form of a strip. A strip of uncured sponge rubber is then superposed on the cover 14 in juxtaposed relation to the preformed resistance segment 13 of "Plioform". In each event both segments are wrapped in the fabric cover, and the core 11 is vulcanized therein which may be done in a vulcanizing press or by continuously pulling the fabric cover 14 containing the core 11 through a heated tube having a longitudinal slot in one side, as described in United States Patent No. 1,629,013.

Fig. 2 illustrates an application of the strip 8 to an automobile door jamb 16 for sealing the seam 16' between it and an automobile door 17. The door 17 is shown in its closed position and its inside 18 abuts against the bead 10 opposite to the sponge rubber segment 12. The flange 9 of the cover is secured between the upholstery material 19 and the door jamb 16 by means of tacks 20. The bead 10 opposite the soft solid vulcanized rubber segment 13 abuts against the upholstery material 19 and forms a firm support for the soft sponge rubber segment 12. When the door contacts with the bead 10, the core portion is supported by the solid rubber 13 while the soft sponge rubber segment 12 yields. Consequently, substantially all of the deformation of the bead 10 occurs along the sealing line of contact which is formed by the flat sealing surface 21 produced by the pressure of the door 17 against the soft resilient sponge rubber segment 12.

While the preferred embodiments of this invention have been described herein, it will be understood that changes in the details thereof may be made without departing from the spirit and scope of the invention as defined by the appended claims.

Having thus described my invention what I claim and desire to protect by Letters Patent is:

1. A packing strip comprising a bead having a core formed in part of a segment of soft resilient material and in part of a segment of more firm material, each of said segments forming a substantial portion of the outer surface of said core, a cover enclosing said core and adhered to both of said segments and having its longitudinal edges extending laterally from said core and offset from the principal portion of said firm segment.

2. A packing strip comprising a bead having a core formed in part of a segment of soft sponge rubber adapted to yield when pressure is applied thereto, said core being formed in part of a segment of soft solid vulcanized rubber adapted to resist such pressure and support the soft sponge rubber, each of such segments forming a substantial portion of the outer surface of said core, a fabric cover enclosing and vulcanized to said core and having edges extending laterally therefrom to form a flange on said bead, and said flange extending radially from said core substantially along the line of division between said segments.

CHESTER J. RANDALL.